(12) United States Patent
Vijaywargi et al.

(10) Patent No.: US 9,367,638 B2
(45) Date of Patent: Jun. 14, 2016

(54) SURFACING ACTIONS FROM SOCIAL DATA

(75) Inventors: Deepak Vijaywargi, Seattle, WA (US); Antoine El Daher, Kenmore, WA (US); Michael Schechter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 363 days.

(21) Appl. No.: 13/406,203

(22) Filed: Feb. 27, 2012

(65) Prior Publication Data

US 2013/0031080 A1 Jan. 31, 2013

Related U.S. Application Data

(63) Continuation-in-part of application No. 13/190,744, filed on Jul. 26, 2011.

(51) Int. Cl.
*G06F 17/30* (2006.01)
(52) U.S. Cl.
CPC ................................. *G06F 17/30887* (2013.01)
(58) Field of Classification Search
CPC .................................................. G06F 17/30867
USPC ........................................................ 707/751
See application file for complete search history.

(56) References Cited

U.S. PATENT DOCUMENTS

| | | |
|---|---|---|
| 5,794,259 A | 8/1998 | Kikinis et al. |
| 7,702,678 B2 | 4/2010 | Teague |
| 7,788,274 B1 | 8/2010 | Ionescu |
| 7,836,009 B2 | 11/2010 | Paczkowski et al. |
| 7,930,384 B1 | 4/2011 | Lester et al. |
| 2007/0038641 A1 | 2/2007 | Fawcett et al. |
| 2007/0198741 A1 | 8/2007 | Duffy et al. |
| 2007/0255735 A1 | 11/2007 | Taylor et al. |
| 2007/0283425 A1 | 12/2007 | Ture et al. |
| 2008/0005072 A1 | 1/2008 | Meek et al. |
| 2008/0133540 A1 | 6/2008 | Hubbard et al. |
| 2008/0200154 A1 | 8/2008 | Maharajh et al. |
| 2008/0313574 A1 | 12/2008 | Aravamudan et al. |
| 2009/0089245 A1 | 4/2009 | Chi |
| 2009/0193007 A1 | 7/2009 | Mastalli et al. |
| 2009/0204579 A1 | 8/2009 | Govani et al. |
| 2009/0204610 A1 | 8/2009 | Hellstrom et al. |
| 2009/0325556 A1 | 12/2009 | Lee et al. |
| 2009/0327860 A1* | 12/2009 | Georgiev .......... G06F 17/30882 715/234 |
| 2010/0049709 A1 | 2/2010 | Ravikumar et al. |
| 2010/0114908 A1 | 5/2010 | Chand et al. |

(Continued)

OTHER PUBLICATIONS

Guess, Angela, "Bing Further Leverages the Semantic Web with Action Buttons", Published on: Sep. 26, 2011, Available at: http://semanticweb.com/bing-further-leverages-the-semantic-web-with-action-buttons_b23447.

(Continued)

*Primary Examiner* — Kris Mackes
(74) *Attorney, Agent, or Firm* — Dave Ream; Tom Wong; Micky Minhas

(57) ABSTRACT

Social data is used to extract actions that end users perform in order to provide deeplinks for search results. Social data from social networking services may be accessed and analyzed to identify actions performed by end users. Additionally, the social data may be analyzed to identify URLs of web pages at which the actions may be performed. Information regarding the actions and corresponding URLs is stored for use by a search engine service to provide deeplinks for search results returned in response to user search queries.

16 Claims, 12 Drawing Sheets

(56) References Cited

U.S. PATENT DOCUMENTS

| | | | |
|---|---|---|---|
| 2010/0223244 | A1 | 9/2010 | Sinha et al. |
| 2010/0228731 | A1 | 9/2010 | Gollapudi |
| 2010/0250528 | A1 | 9/2010 | Punera et al. |
| 2011/0072046 | A1 | 3/2011 | Chi |
| 2011/0087647 | A1* | 4/2011 | Signorini et al. ............ 707/709 |
| 2011/0119269 | A1 | 5/2011 | Agrawal et al. |
| 2011/0125759 | A1 | 5/2011 | Querel et al. |
| 2011/0131241 | A1 | 6/2011 | Petrou et al. |
| 2011/0137989 | A1 | 6/2011 | Kiciman et al. |
| 2011/0191316 | A1 | 8/2011 | Lai et al. |
| 2011/0225192 | A1 | 9/2011 | Imig et al. |
| 2011/0252060 | A1 | 10/2011 | Broman et al. |
| 2011/0258032 | A1 | 10/2011 | Vadlamani et al. |
| 2011/0264673 | A1 | 10/2011 | White et al. |
| 2011/0295861 | A1 | 12/2011 | Lacasse |
| 2012/0023089 | A1 | 1/2012 | Chandra et al. |
| 2012/0245925 | A1* | 9/2012 | Guha et al. ....................... 704/9 |

OTHER PUBLICATIONS

Zhao, et al., "Predicting Short-Term Interests Using Activity-Based Search Context", In Proceedings of the 19th ACM International Conference on Information and Knowledge Management, vol. 36, Issue 4, Aug. 2006, pp. 873-886.

Bayer, Derek, "Bing: Decision Engine Instead of Search Engine?", Retrieved on: Apr. 20, 2011, Available at:http://www.derekbayer.com/bing-decision-engine-instead-of-search-engine.

D'Technology Weblog, "Bing Bar Lands with Search, Alerts, Facebook, Mail and Bing Reward", Retrieved on: Apr. 20, 2011, Available at:http://www.ditii.com/2011/02/17/bing-bar-lands-with-search-alerts-facebook-mail-and-bing-reward/.

Henzinger, Monika, "Link Analysis in Web Information Retrieval", In Proceedings of Bulletin of the IEEE Computer Society Technical Committee on Data Engineering, vol. 23, Issue 3, Sep. 2000, pp. 3-8.

Kammenhuber, et al., "Web Search Clickstreams", In Proceedings of Internet Measurement Conference, Oct. 25-27, 2006, 6 pages.

Lakkaraju, et al., "Unified Modeling of User Activities on Social Networking Sites", In Proceedings of NIPS Workshop on Computational Social Science and the Wisdom of Crowds, 2011, pp. 1-5.

Mika, Peter, "Ontologies Are Us: A Unified Model of Social Networks and Semantics", In Proceedings of ISWC vol. 3729, Nov. 2005, pp. 522-536.

Seo, et al., "Generalized Link Suggestions via Web Site Clustering", In proceedings of the 20th international conference on World wide web, Mar. 28-Apr. 1, 2011, 10 pages.

Shazly, et al., "Profile-Based Mood Extraction from a Social Network", In Proceedings of International Conference on Internet Computing, Jul. 17, 2011, 7 pages.

Sizemore, Everett, "Building Deep Links into E-Commerce Product Pages", Retrieved on: Apr. 20, 2011, Available at:http://www.seomoz.org/blog/building-deep-links-into-ecommerce-pages.

Taksa, et al., "A Task-oriented Approach to Search Engine Usability Studies", In Journal of Software, vol. 3, No. 1, Jan. 2008, pp. 63-73.

Non Final Office Action in U.S. Appl. No. 13/406,181, mailed Feb. 13, 2014, 34 pages.

Final Office Action in U.S. Appl. No. 13/190,744, mailed Feb. 26, 2014, 26 pages.

Non Final Office Action in U.S. Appl. No. 13/406,192, mailed Mar. 27, 2014, 40 pages.

Non-Final Office Action mailed Jul. 31, 2013 in U.S. Appl. No. 13/190,744, 18 pages.

Kang, "Transactional Query Identification in Web Search", AIRS 2005, Springer-Veriag, Berlin Heidelberg, 2005, pp. 221-232.

Notice of Allowance and Fee(s) Due in U.S. Appl. No. 13/406,181, mailed May 21, 2014, 21 pages.

Final Office Action in U.S. Appl. No. 13/528,508, mailed May 23, 2014, 42 pages.

Office Action dated Oct. 23, 2014 in U.S. Appl. No. 13/528,508, 17 pages.

Final Office Action dated Nov. 20, 2014 in U.S. Appl. No. 13/406,192, 24 pages.

Non-Final Office Action dated Mar. 27, 2015 in U.S. Appl. No. 13/406,192, 12 pages.

Notice of Allowance dated Aug. 14, 1205 in U.S. Appl. No. 13/406,192, 8 pages.

Final Office Action dated Jul. 17, 2015 in U.S. Appl. No. 13/528,508, 19 pages.

* cited by examiner

SURFACING ACTIONS FROM SOCIAL DATA

CROSS-REFERENCE TO RELATED APPLICATIONS

This application is a continuation-in-part of U.S. patent application Ser. No. 13/190,744, filed Jul. 26, 2011, which is herein incorporated by reference in its entirety. This application is also related by subject matter to the inventions disclosed in the following U.S. patent applications filed on even date herewith: U.S. application Ser. No. (not yet assigned), entitled "Context-Aware Parameterized Action Links for Search Results;" and U.S. application Ser. No. (not yet assigned), entitled "Personalized Deeplinks for Search Results;" which are assigned or under obligation of assignment to the same entity as this application, and incorporated in this application by reference.

BACKGROUND

The amount of information and content available on the Internet continues to grow exponentially. Given the vast amount of information, search engines have been developed to facilitate web searching. In particular, users may search for information and documents by entering search queries comprising one or more terms that may be of interest to the user. After receiving a search query from a user, a search engine identifies documents and/or web pages that are relevant based on the terms. A search page is returned with a list of hyperlinks to "landing pages" that correspond with the identified documents and/or web pages. Because of its utility, web searching, that is, the process of finding relevant web pages and documents for user-issued search queries has arguably become one of the most popular services on the Internet today. However, in some instances, when a user selects a search result and accesses a landing page, although that landing page may be within a website (i.e., collection of web pages within a given domain) that contains the information the user is after, that particular landing page may not have the relevant information. As a result, the user may have to browse or search pages within the website to find the information the user is seeking.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying actions from social data and using the action data to provide deeplinks for search results. Social data from social networking services may initially be accessed. The social data may be analyzed to identify actions discussed by end users. Additionally, the social data may be analyzed to identify uniform resource locators (URLs) of web pages at which the actions may be performed. Information is stored regarding identified actions and corresponding URLs for providing deeplinks as part of search results returned in response to user search queries.

BRIEF DESCRIPTION OF THE DRAWINGS

The present invention is described in detail below with reference to the attached drawing figures, wherein.

DETAILED DESCRIPTION

Figure 1:
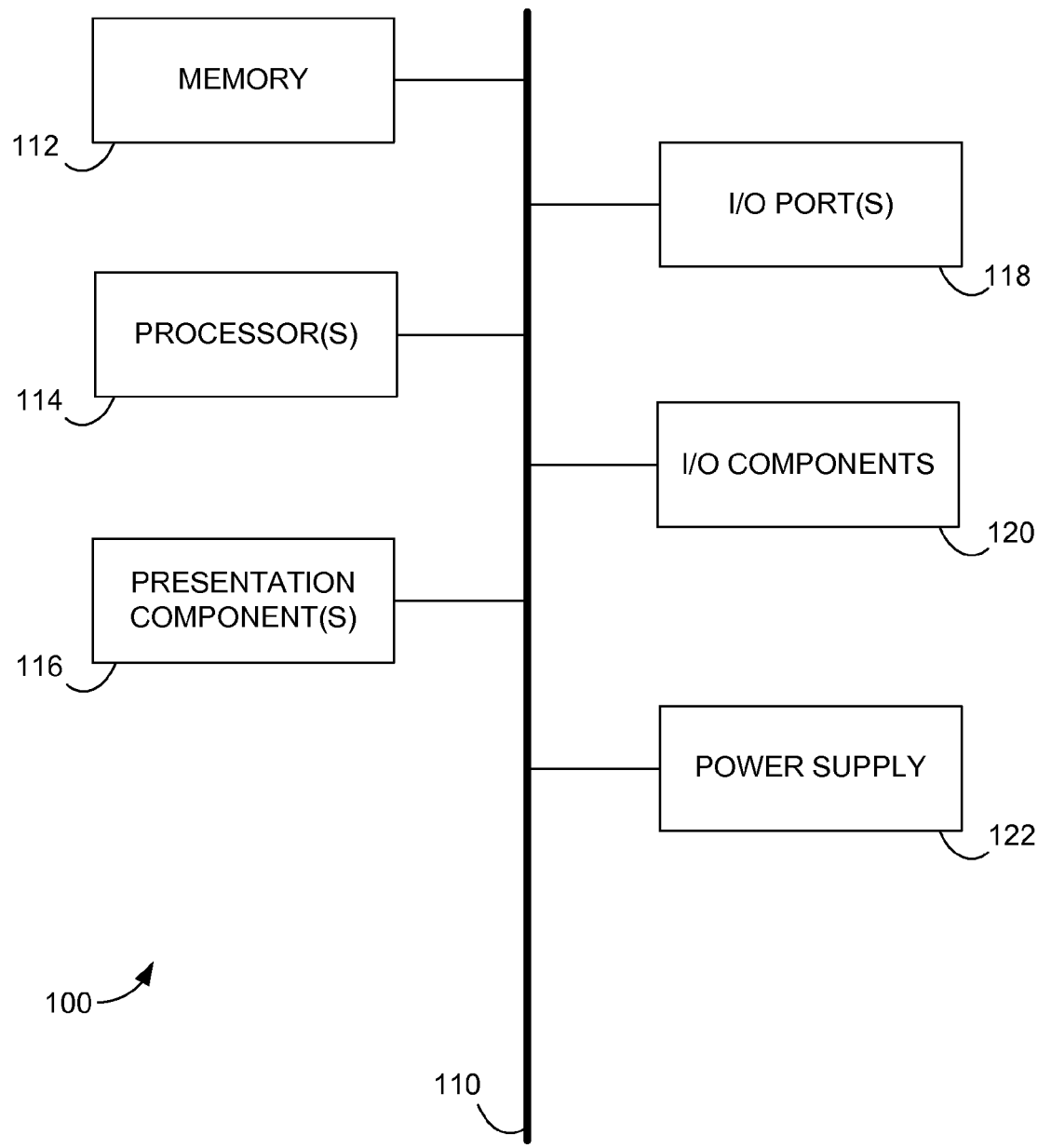
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed above, one problem that users may face when employing search engines is that although a search result returned may correspond with a web page within a website containing the relevant information the user is seeking or a particular action the user wishes to perform, the user may be required to browse the website after selecting the search result to find the information or to perform the action. For instance, suppose a user wishes to check into a flight on an airline. The user may issue a search query for the airline and receive search results that include a hyperlink to the main web page of the website for the airline. After selecting the hyperlink to the main web page for the airline, the user would then need to find a location within the web site for checking into the flight. In some cases, this may be a time-consuming task.

One approach to addressing this problem has been the inclusion of deeplinks in search results on search result pages. As used herein, the term "deeplinks" refers to additional hyperlinks that are provided in association with a matching search result. In other words, a search result may include a hyperlink to a main destination web page, as well as deeplinks to other web pages to which the main destination web page links. For instance, in the example above, the main web page for the airline (i.e., the main destination web page) may include a hyperlink to a web page within the airline's website for logging into flights for the airline. Accordingly, a hyperlink to the location for checking into flights for the airline could be included as a deeplink in association with the hyperlink to the main web page for the airline provided as a search result to a user's search query. Although deeplinks allow users to more quickly access the information they are seeking or perform particular actions, the deeplinks included in search results vary from web page to web page, resulting in a fragmented experience for users. As a result, users may not quickly recognize a deeplink and may even simply select the hyperlink to the main destination web page for the search result, thereby missing out on the benefits of the deeplinks.

Some embodiments of the present invention are directed to providing action-based deeplinks with search results to provide a more consistent experience across web pages within a category of web pages. The action-based deeplinks link to locations that allow users to perform actions that are common to a given web page category. For instance, suppose that a web page category is an airline category, which includes the web pages of different airlines. The action-based deeplinks that may be provided would link to locations within the airline websites that allow users to perform airline-related actions such as checking into flights, check the status of flights, and booking flight reservations. To provide a consistent experience, the search results for airline web pages returned in response to search queries may have the same type of action-based deeplinks. While the action-based deeplinks are similar to traditional deeplinks, the action-based deeplinks differ from traditional deeplinks in that while traditional deeplinks are specific to a given web page, the action-based deeplinks are similar for web pages within a given category, thereby providing a more consistent user experience. This approach makes it easier for users to quickly navigate to a desired location and perform key tasks, thereby reducing the overall time required to perform the tasks.

In some embodiments of the present invention, action-based deeplinks may be identified for web pages by first categorizing web pages into a variety of categories. Each category is then analyzed to identify action-based deeplinks for web pages in each category. For a given category, hyperlinks within web pages of that category are identified and grouped into a number of clusters. Each cluster may correspond with a particular action users perform when visiting the web pages. For instance, in the example of airlines categories, the actions may include checking into a flight, check the status of a flight, and making flight reservations. Hyperlinks are identified within web pages that allow users to perform each action. Based on that information, action-based deeplinks may be provided when returning search results for those web pages. Again, because the action-based deeplinks may be similar among web pages within a given category, a more consistent user experience may be provided that allows users to more quickly perform desired tasks.

Social data may be used in some embodiments to identify actions performed by users for purposes of determining which deeplinks to provide with search results. In particular, end users often discuss actions that they perform in social networking messages, such as posts or status update messages. For instance, an end user may post a message that states: "I just watched Star Wars: Episode I at Regal Cinemas." Here, the action identified would be a "watch" action or a "buy movie tickets" action. By analyzing social data, actions that are commonly being performed by end users may be identified. Accordingly, deeplinks that allow end users to perform those actions may be provided with search results.

Accordingly, in one aspect, an embodiment of the present invention is directed to one or more computer storage media storing computer-useable instructions that, when used by one or more computing devices, cause the one or more computing devices to perform a method. The method includes accessing social data from one or more social networking services. The method also includes analyzing the social data to identify a plurality of actions. The method further includes analyzing the social data to identify at least one URL for each action, each URL corresponding with a webpage at which a corresponding action may be performed. The method still further includes storing information regarding at least a portion of the plurality of actions and corresponding URLs for providing deeplinks for search results.

In another embodiment, an aspect is directed to one or more computer storage media storing computer-useable instructions that, when used by one or more computing devices, cause the one or more computing devices to perform a method. The method includes accessing social data from one or more social networking services. The method also includes analyzing the social data to identify a plurality of actions and analyzing the social data to identify a plurality of segments. The method further includes identifying a group of actions for a first segment based on the plurality of actions and plurality of segments from the social data. The method also includes selecting top actions from the group of actions for the first segment. The method further includes identifying a URL for each top action. The method still further includes storing information regarding the top actions and corresponding URLs for providing deeplinks for search results.

A further embodiment of the present invention is directed to a method. The method includes receiving a search query from an end user at a search engine service. The method also includes identifying a web page in response to the search query by querying a search engine index based on the search query. The method further includes identifying deeplinks for the web page, at least one deeplink having been identified based at least in part on an analysis of social data. The method also includes generating a search result for the web page to include the deeplinks. The method still further includes providing the search result for presentation to the end user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not include signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Action-Based Deeplinks

Figure 2:
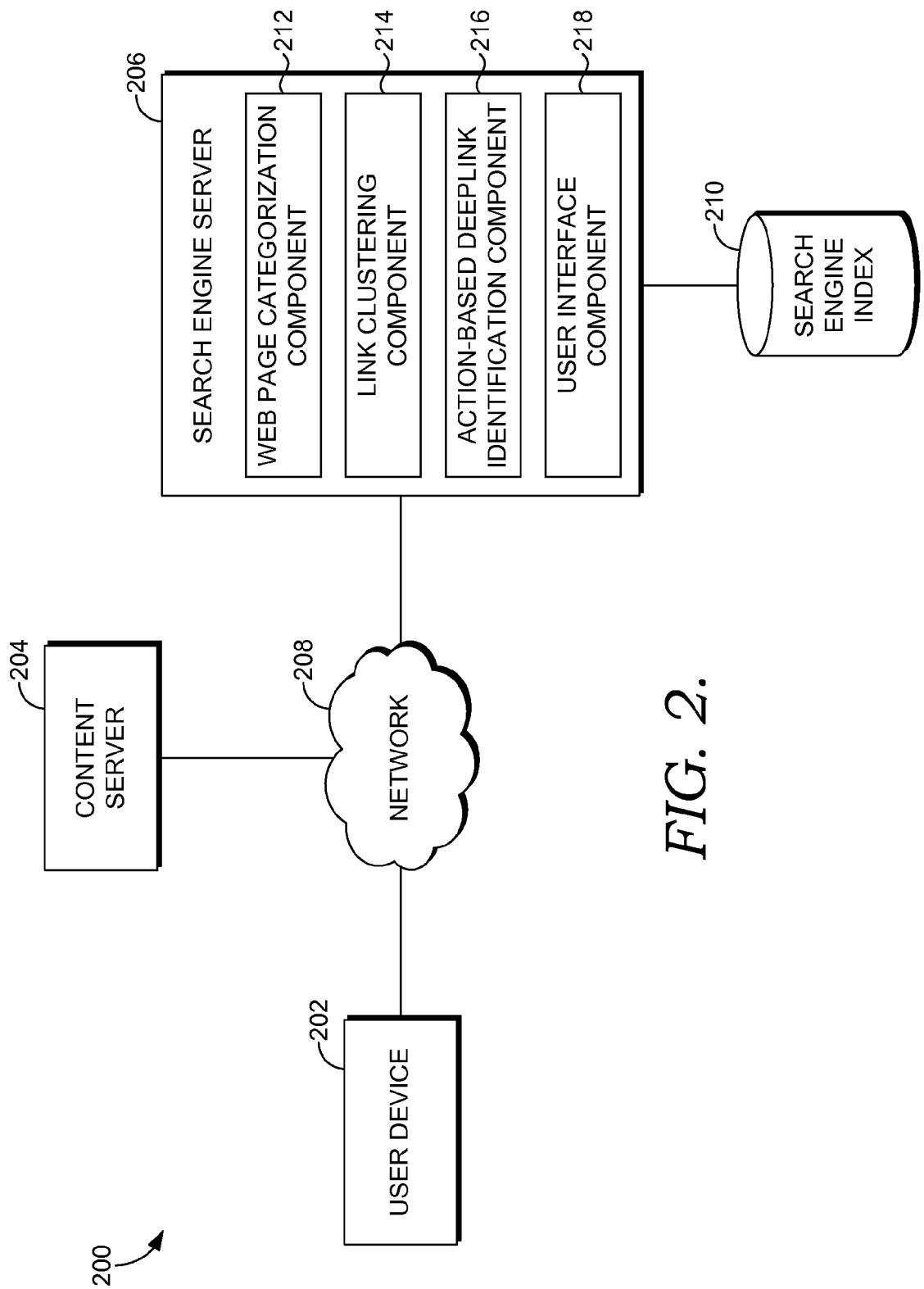
FIG. 2 is a block diagram of an exemplary system in which embodiments of the invention may be employed.

As previously indicated, action-based deeplinks may be provided with search results to allow users to access and perform actions that are common to web pages within a given category. Referring to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user device 202, content server 204, and search engine server 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 200 within the scope of the present invention. Each may comprise a single device or multiple devices cooperating in a distributed environment. For instance, the search engine server 206 may comprise multiple devices arranged in a distributed environment that collectively provide the functionality of the search engine server 206 described herein. Additionally, other components not shown may also be included within the system 200.

The search engine server 206 generally operates to index information regarding web pages served by content servers, such as the content server 204, in a search engine index 210. When the search engine server 206 receives search queries from user devices, such as the user device 202, the search engine queries the search engine index 210 to identify search results based on the users' search queries and returns those search results to the user devices. In accordance with embodiments of the present invention, the search engine server 206 is also configured to identify action-based deeplinks for some web pages and to provide those action-based deeplinks when providing search results corresponding with those web pages.

In the embodiment shown in FIG. 2, the search engine server 206 includes, among other things, a web page categorization component 212, a link clustering component 214, an action-based deeplink identification component 216, and a user interface component 218.

The web page categorization component 212 operates to identify a category for each of a number of different web pages served by content servers, such as the content server 204, and indexed in the search engine index 210. As a result, web pages are clustered together into various categories. By way of example only and not limitation, the web page categorization component 212 may identify web pages within a restaurants category, hotels category, airlines category, and social networks category, to name a few.

Web page categorization may be performed in any of a number of different manners within the scope of embodiments of the present invention. In some embodiments, the categorization may be based on an existing repository of web page categorizations, such as the Open Directory Project (ODP). In some embodiments, web pages may be automatically grouped together into categories by analyzing the content of the pages. For instance, clustering techniques may be employed to cluster the web pages based on their content. As another example, the web pages may be categorized by looking for particular keywords in the content of the web pages. Web page categorization could also be automatically performed by analyzing the hyperlinks within the content of the web pages. Web page categorization may also include a manual approach based on editorial review of web pages to manually place the web pages into the different categories. In still further embodiments, a sample of manually-categorized web pages may be used as seeds for an automatic approach in which other web pages are compared against the seed web pages to categorize the other web pages. Any and all such variations and combinations thereof are contemplated to be within the scope of embodiments of the present invention.

The link clustering component 214 operates to cluster hyperlinks found on web pages within each category. For a given category, the link clustering component 214 may analyze hyperlinks contained within the web pages within that given category to cluster the hyperlinks into a number of clusters. The clustering may be performed in some embodiments by analyzing the words in the anchor text of the hyperlinks. As is known in the art, the anchor text refers to the displayed text of a hyperlink. Hyperlinks containing similar words would be clustered together. In some embodiments, the content of each hyperlink's destination web page may be analyzed to cluster the hyperlinks. In still further embodiments, the clustering may include manual review of hyperlinks and/or destination web pages of the hyperlinks to facilitate clustering.

In some embodiments, the link clustering component 214 may analyze and cluster all hyperlinks within each web page within the category. In other embodiments, the link clustering component 214 may cluster only a portion of hyperlinks from the web pages. For instance, the link clustering component 214 may consider only the hyperlinks that meet some threshold based on user clicks on the hyperlinks. In some embodiments, the search engine server 206 may receive click-through data collected by web browsers, search toolbars, or other mechanisms on user devices, such as the user device 202. The click-through data may indicate the hyperlinks that users have clicked within web pages when viewing those web pages. Based on such click-through data, the most-clicked hyperlinks on a given web page may be identified and only those hyperlinks considered by the link cluster component 214. For instance, only the hyperlinks that have received a threshold number of clicks or that have a threshold click-through rate (i.e., the percentage of web page visits for the web page that have resulted in a click on the hyperlink) may be considered.

In some embodiments, the search engine server 206 may be configured to provide traditional deeplinks. In such embodiments, the link clustering component 214 may consider only hyperlinks corresponding with the deeplinks for the web page. All deeplinks may be considered in some embodiments, while only a portion of the deeplinks may be considered in other embodiments. For an example of the latter, the search engine server 206 may track user clicks of deeplinks from search results. Based on such click data, the search engine server 206 may identify the hyperlinks that correspond with the most-clicked deeplinks and only those hyperlinks considered by the link cluster component 214. For instance, only the hyperlinks that correspond with deeplinks that have received a threshold number of clicks or that have a threshold click-through rate (i.e., the percentage of search results for the web page that have resulted in a click on the deeplink) may be considered.

Based on the clustering of hyperlinks from the link clustering component 214, the action-based deeplink identification component 216 may identify one or more different types of actions for the web page category being analyzed. In particular, each action may correspond with a type of action users perform using hyperlinks within a cluster of hyperlinks. For instance, if the web page categorization being analyzed is an airlines category, a first cluster of hyperlinks may correspond with locations for checking into flights, a second cluster of hyperlinks may correspond with locations for checking the status of flights, and a third cluster of hyperlinks may correspond with locations book making flight reservations. As such, a check in action may be identified based on first cluster of hyperlinks, a check status action may be identified based on the second cluster of hyperlinks, and a reservations action may be identified based on the third cluster of hyperlinks.

In some embodiments, the action-based deeplink identification component 216 may consider each cluster identified by the link clustering component 214 and identify an action for each of those clusters. In other embodiments, only clusters that meet some threshold may be processed by the action-based deeplink identification component 214 to identify an action for each of those clusters. For instance, in some embodiments, only clusters that include a threshold number of hyperlinks may be further processed by the action-based deeplink identification component 214. In some embodiments, click-through rates for each hyperlink in a cluster may be analyzed to determine whether to process the cluster. In such embodiments, actions may be identified only for clusters with hyperlinks that satisfy a threshold level of click-throughs. The click-through data may represent user clicks on hyperlinks when visiting the web page. Such click-though data may be collected by web browsers, search engine tool bars, or other mechanisms on user devices, such as the user device 202, and provided to the search engine server 206. In instances in which the hyperlinks correspond with deeplinks, deeplink click-through data may be employed. The deeplink click-through data represents user clicks on deeplinks presented in search results.

After identifying an action for a web page category, the action-based deeplink identification component 216 may identify, for web pages within the category, hyperlinks that correspond with that action. For instance, if the web page category being analyzed is an airlines category and an identified action is checking into flights, hyperlinks on web pages within the category that link to locations that allow users to check into flights would be identified as corresponding with that action. The URL for those locations or other information may then be stored in association with each web page in the search engine index 210 to allow for providing action-based deeplinks when returning search results to search queries.

A hyperlink corresponding with an action may be identified for web pages within a given category in a number of different ways. In some instances, the hyperlinks may be identified from the cluster of hyperlinks for that action. In some cases, a web page may not have had a hyperlink placed in that cluster. For such a web page, hyperlinks from that web page may be analyzed to identify a hyperlink that corresponds with the action. This may include, for instance, automatically analyzing the anchor text of hyperlinks and/or the content of the destination web pages of the hyperlinks to identify a hyperlink that corresponds with the action. For instance, the anchor text or content of the destination web page for a hyperlink may be compared against the anchor text and/or destination web page content for hyperlinks in the cluster of hyperlinks used to identify the action. In some embodiments, editors may manually review web pages to identify hyperlinks that correspond with an action. Any and all such variations and combinations thereof are contemplated to be within the scope of embodiments of the present invention.

In some embodiments, a hyperlink may be identified for a particular action for only a portion of web pages in the category. In other embodiments, a hyperlink for an action may be identified for most or even all web pages in the category. In this way, an action-based deeplink may be provided with search results for the web pages in the category to provide users with a consistent experience. This would allow users to more quickly get to the information and perform desired actions.

The user interface component 218 provides an interface to user devices, such as the user device 202, that may allow users to submit search queries to the search engine server 206 and to receive search results from the search engine server 206. It should be understood that the user device 202 may be any type of computing device employed by a user to submit search queries and receive search results. By way of example only and not limitation, the user device 202 may be a desktop computer, a laptop computer, a tablet computer, a mobile device, or other type of computing device. The user device 202 may include an application that allows a user to enter a search query and submit the search query to the search engine server 206 to retrieve search results. For instance, the user device 202 may include a web browser that includes a search input box or allows a user to access a search page to submit a search query. Other mechanisms for submitting search queries to search engines are contemplated to be within the scope of embodiments of the present invention.

When the search engine server 206 receives a search query, the search engine index 210 is queried to identify search results. In some instances, a search result may have a corresponding action-based deeplink that has been identified by the action-based deeplink identification component 216. Accordingly, when the search engine server 206 returns the search result to the user device 202, the search result includes not only a hyperlink to the destination web page of the search result, but also an action-based deeplink that links to a location that allows the user to perform a corresponding action. In some embodiments, the search engine server 206 may return a search result that includes a hyperlink to the destination web page of the search result, one or more traditional deeplinks, and one or more action-based deeplinks based on information indexed for a web page corresponding with the search result.

Figure 3:
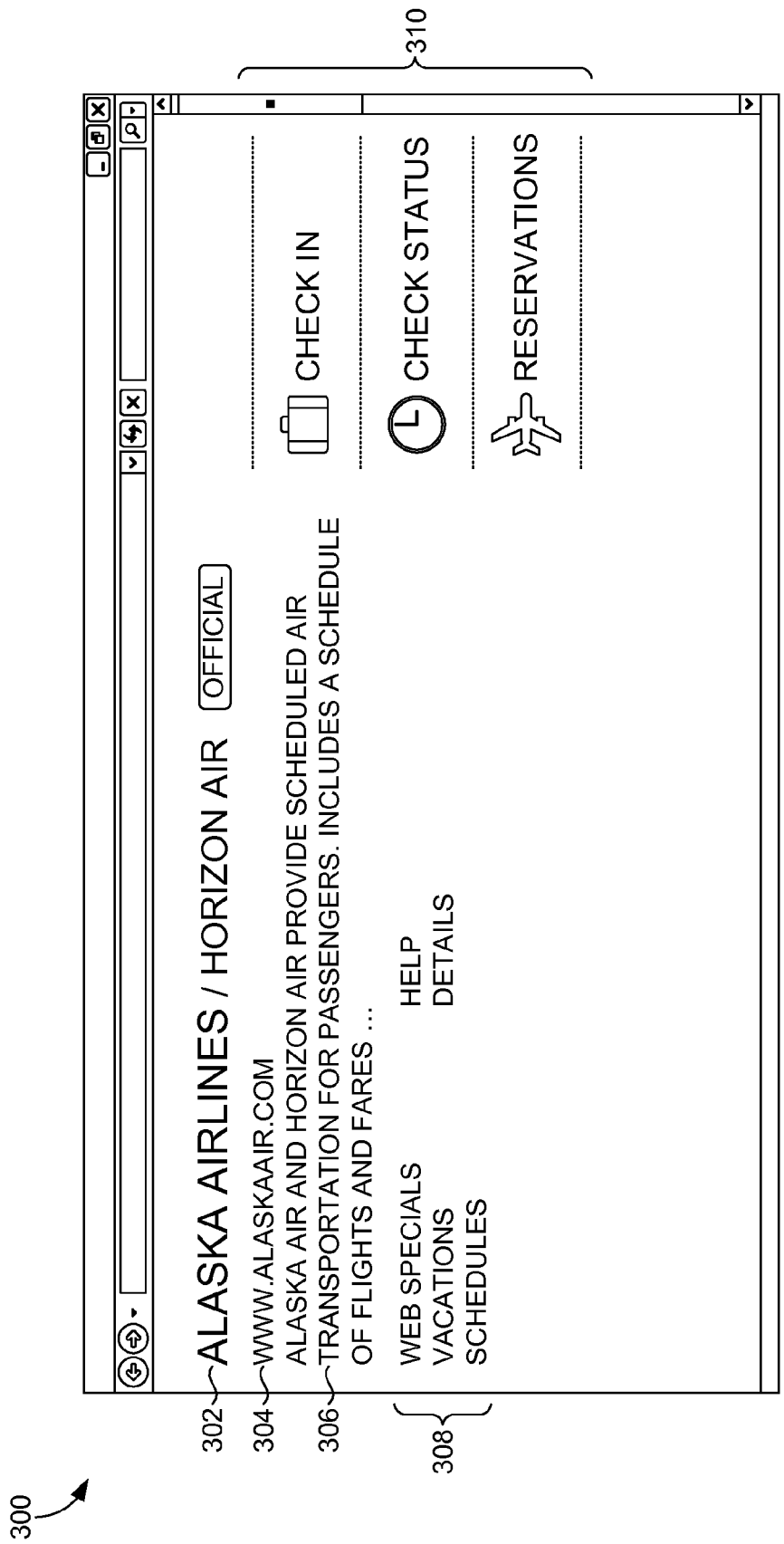
FIG. 3 is a screenshot providing an example of a search result with action-based deeplinks in accordance with an embodiment of the present invention.
Figure 4:
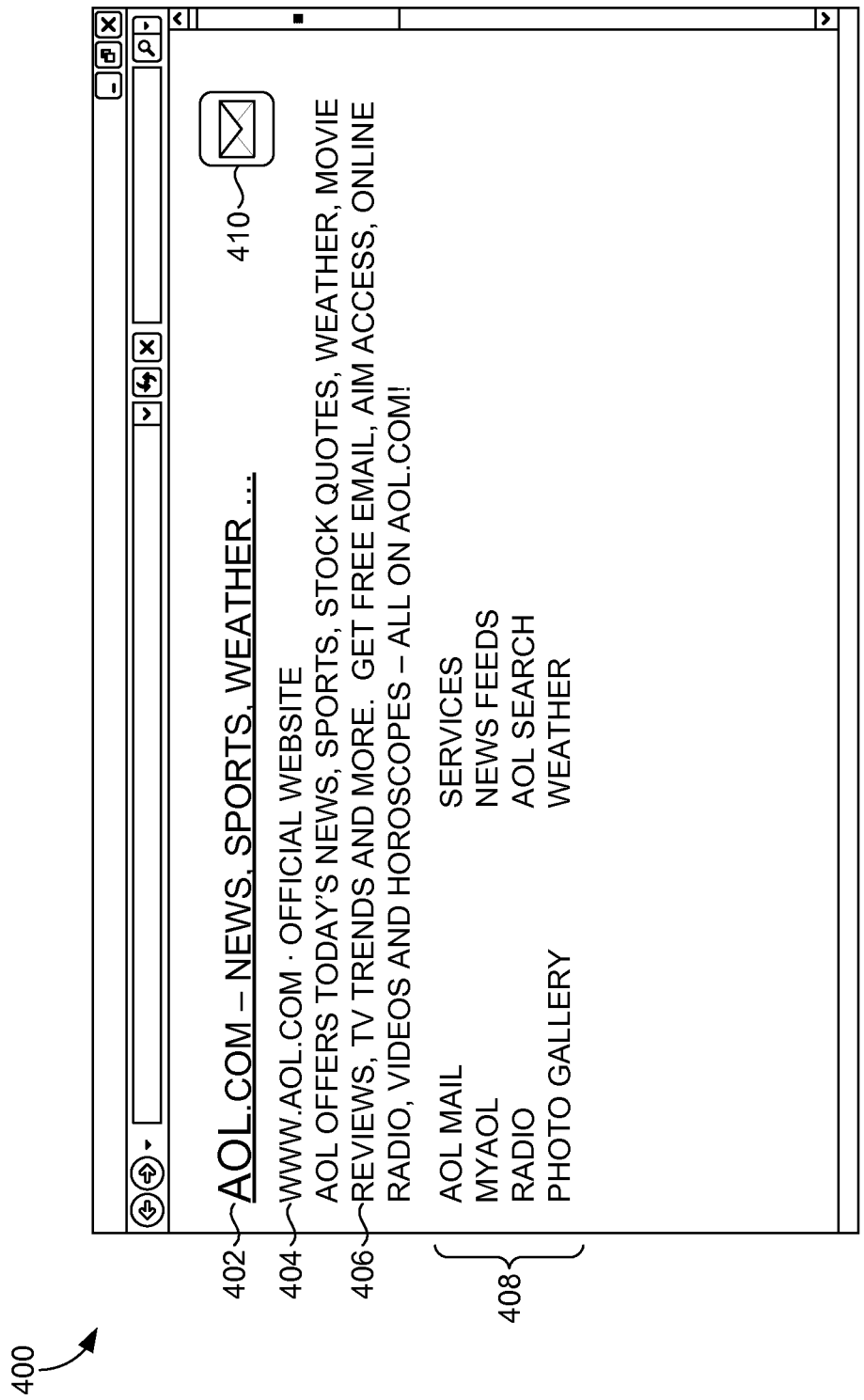
FIG. 4 is a screenshot providing another example of a search result with an action-based deeplink in accordance with an embodiment of the present invention.

Examples of search results that include action-based deeplinks are illustrated in the screen displays shown in FIGS. 3 and 4. It should be understood and appreciated by those of ordinary skill in the art that the screen displays of FIGS. 3 and 4 are provided by way of example only and are not intended to limit the scope of the present invention in any way.

Referring first to FIG. 3, a search result 300 is displayed that corresponds with the ALASKA AIRLINES web page. The search result 300 may be provided in response to a search query, such as "alaska airlines." As shown in FIG. 3, the search result 300 includes a title 302, the URL 304 of the destination web page for the search result, and a search result snippet 306 that provides a summary of the search result. The search result 300 also includes a number of deeplinks 308 and a number of action-based deeplinks 310, each of which link to a corresponding destination web page. As can be seen from FIG. 3, the search result 300 includes both deeplinks 308 and action-based based deeplinks 310. The deeplinks 308 are specific to the particular web page (i.e., corresponding with www.alaskaair.com), while the action-based deeplinks 310 were identified by analyzing web pages within the airlines category, for instance using the system described above with reference to FIG. 2. Additionally, the deeplinks 308 and action-based deeplinks 310 are displayed differently. In particular, the action-based deeplinks 310 are shown more prominently, using an icon and larger text for each.

Turning next to FIG. 4, another example of a search result 400 is provided. The search result 400 includes a title 402, the URL 404 of the destination web page for the search result 400, and a search result snippet 406. The search result also includes a number of deeplinks 408 and an action-based deeplink 410. In the example of FIG. 4, only a single action-based deeplink 410 is provided. Additionally, the action-based deeplink 410 is presented using only an icon.

In some embodiments, the action-based deeplinks displayed for search results corresponding with each web page in a given category may be consistent across the search results. That is, action-based deeplinks may be provided for the same actions. Additionally, the action-based deeplinks may be presented in a similar manner using common anchor text and/or icons. Accordingly, while the deeplinks presented may vary from web page to web page, the action-based deeplinks may be similar or the same. For instance, when search results for other airlines' web pages are provided in response to search queries, the deeplinks may be different from the deeplinks 308 shown in FIG. 3. However, the action-based deeplinks provided for each search result may be similar to the action-based deeplinks 310 shown in FIG. 3. As noted above, by providing a consistent group of action-based deeplinks for web pages within a category, users may be provided a more consistent experience. As a result, users may be able to more quickly recognize the action-based deeplinks and access a location to perform a desired action.

Figure 5:
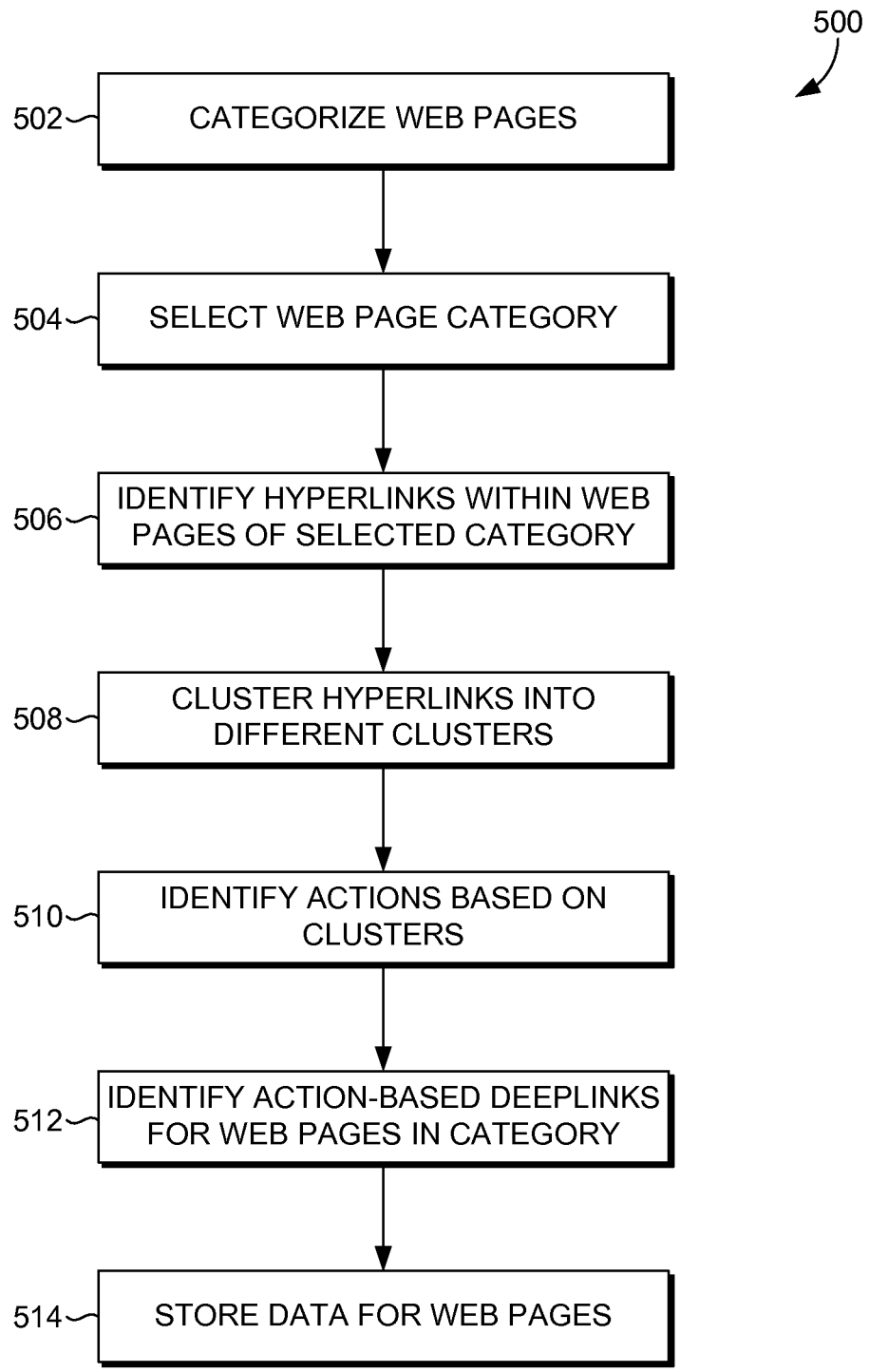
FIG. 5 is a flow diagram showing a method for identifying action-based deeplinks in accordance with an embodiment of the present invention.

With reference now to FIG. 5, a flow diagram is provided that illustrates a method 500 for identifying action-based deeplinks in accordance with an embodiment of the present invention. As shown at block 502, a number of web pages are categorized. Web page categorization may be accomplished in a variety of ways. In some embodiments, web pages may be automatically clustered into categories based on, for instance, the content of the web pages. In some embodiments, an editorial approach may be employed in which web pages may be manually categorized. In further embodiments, an existing web page categorization, such as ODP, may be employed.

As shown at block 504, a web page category is selected for analysis. Hyperlinks within the web pages within the selected category are identified, as shown at block 506. In some embodiments, all hyperlinks contained within those web pages may be identified for further processing. However, in other embodiments, only a subset of hyperlinks may be employed. For instance, some embodiments may identify hyperlinks to consider based on user click data representing user clicks on hyperlinks when users visit the web pages or user clicks on deeplinks in search results, the deeplinks corresponding with particular hyperlinks in the web pages.

The hyperlinks are clustered into a number of clusters, as shown at block 508. In various embodiments, the hyperlink clustering may be based on the anchor text of the hyperlinks, the content of the destination web pages corresponding with the hyperlinks, and/or other data. Common actions for the category of web pages are identified based on the hyperlink clusters, as shown at block 510. In particular, a cluster may be identified as corresponding with a particular action. In some instances, an action is identified for each cluster. In other embodiments, actions are only identified for clusters that meet a threshold, which may be based on, for instance, a total number of hyperlinks within a given cluster, click-through data for hyperlinks within a given cluster, or other data.

Action-based deeplinks are identified for each action for at least a portion of the web pages in the category, as shown at block 512. The action-based deeplinks correspond with hyperlinks in the web pages that link to locations corresponding with each action. Data is stored identifying the action-based deeplinks for web pages, as shown at block 514. This allows for the action-based deeplinks to be provided with search results for the web pages in response to search queries.

Figure 6:
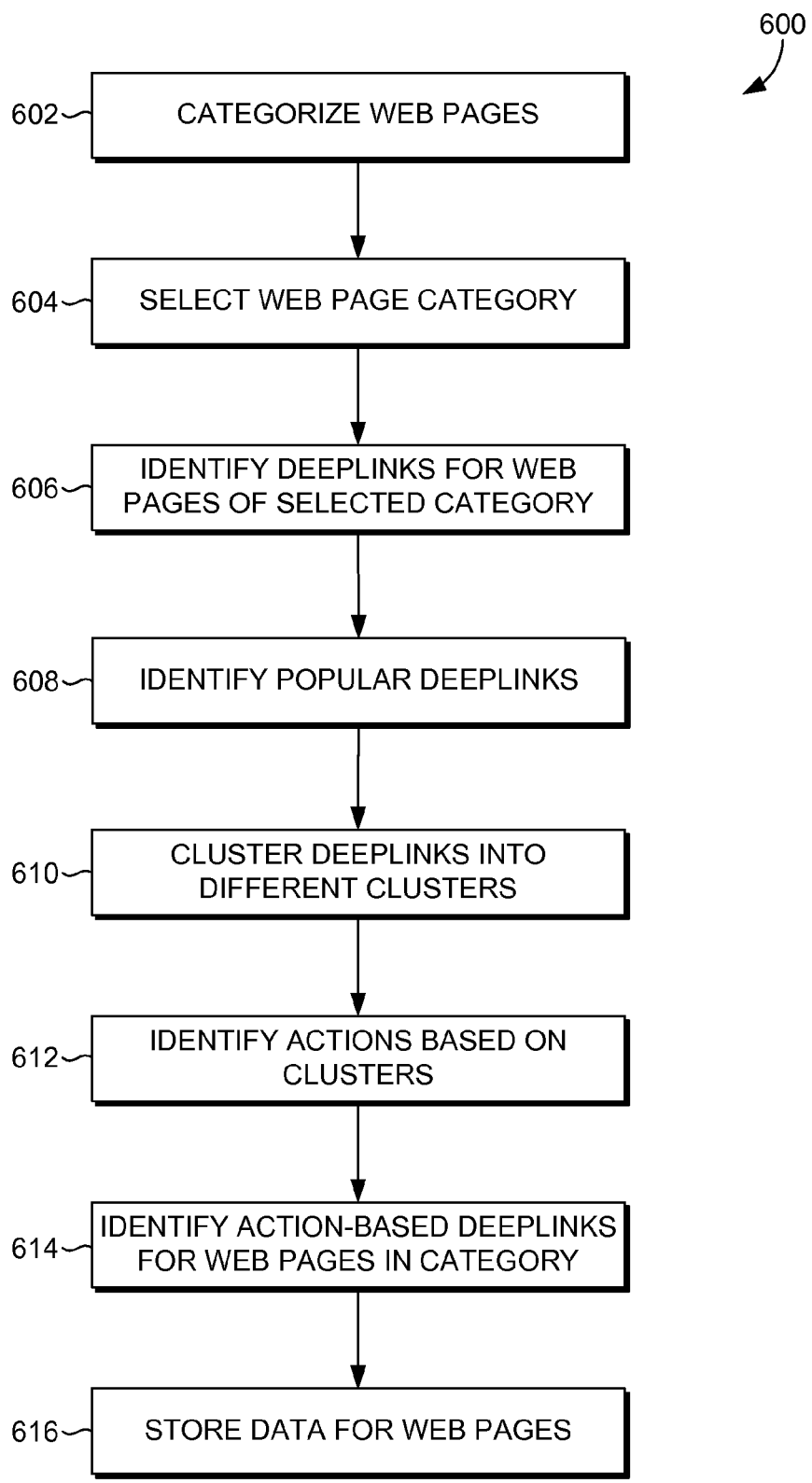
FIG. 6 is a flow diagram showing a method for identifying action-based deeplinks in accordance with another embodiment of the present invention.

As indicated previously, some embodiments may identify action-based deeplinks by analyzing deeplinks from web pages within a given web page category as opposed to analyzing all hyperlinks from those web pages. This specific approach is illustrated in the method 600 shown in FIG. 6. As shown at block 602, web pages are categorized, and a web page category is selected for analysis at block 604.

Deeplinks for web pages in the selected category are identified, as shown at block 606. These deeplinks correspond with hyperlinks that are provided in association with search results for the web pages when returning the web pages as search results in response to search queries. The deeplinks may have been previously identified for the web pages, for instance, by analyzing the hyperlinks in the web pages to identify important or popular hyperlinks (e.g., based on user clicks on the hyperlinks when users visit the web pages).

Popular deeplinks are identified at block 608. This may be performed by analyzing click-through data for the deeplinks. The click-through data may comprise information regarding user clicks on deeplinks when the deeplinks are provided with search results in response to search queries. By way of example only and not limitation, the click-through data for a deeplink may include information such as raw click data or click-through rates based on the number of clicks on the deeplink as compared to the number of times the deeplink is returned with search results.

The popular deeplinks are clustered into a number of clusters, as shown at block 610. The clustering may be based on, for instance, the anchor text of the deeplinks and/or the content of the destination web pages of the deeplinks. Actions are identified based on the clusters of deeplinks, as shown at block 612. In some instances, an action may be identified for each cluster. In other instances, only clusters that satisfy some threshold may be considered for identifying an action. The threshold may be based on, for instance, the number of deeplinks within a cluster or the popularity of the deeplinks in a cluster (e.g., based on click-through data).

For each identified action, hyperlinks within web pages within the selected category are identified as corresponding with the action, as shown at block 614. This may be done for a given action by identifying the deeplinks within the cluster corresponding with the action. In some embodiments, the hyperlinks may be automatically identified by analyzing the anchor text of hyperlinks or content of the destination web pages of the hyperlinks. This may include comparison of the anchor text or content of the destination web pages to the action or the cluster of deeplinks corresponding with the action (for instance, the anchor text or destination web pages for those deeplinks). In further embodiments, the hyperlinks may be manually identified by editors who review the web pages to identify hyperlinks corresponding with an action.

As shown at block 616, data is stored identifying the action-based deeplinks for web pages. This allows for the action-based deeplinks to be provided with search results for the web pages in response to search queries.

Figure 7:
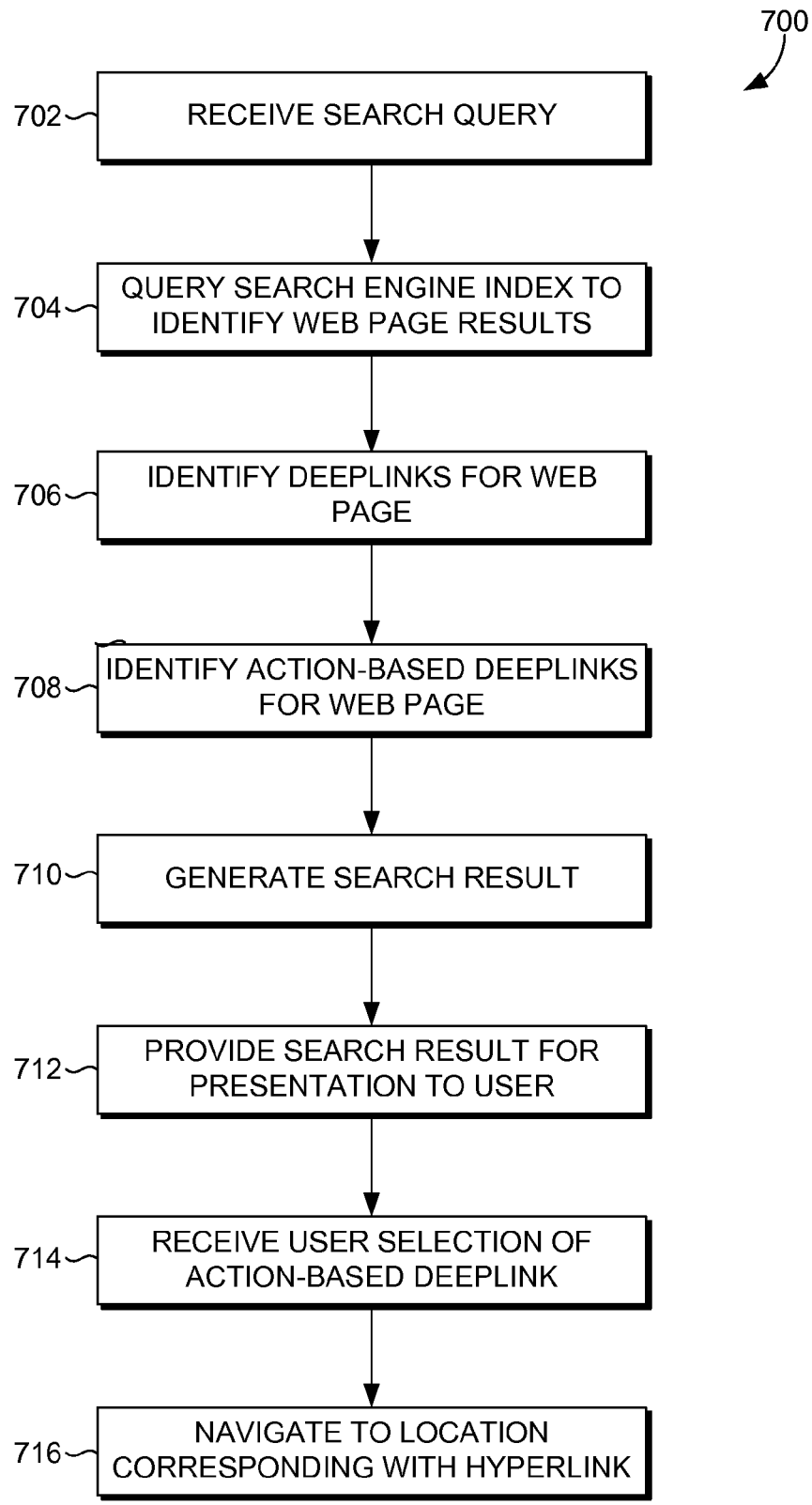
FIG. 7 is a flow diagram showing a method for returning a search result with an action-based deeplink in accordance with an embodiment of the present invention.

Turning now to FIG. 7, a flow diagram is provided that illustrates a method 700 for providing a search result that includes an action-based deeplink in response to a search query in accordance with an embodiment of the present invention. As shown at block 702, a search query is received from an end user. In response to the search query, a search engine index is searched to identify relevant web pages, as shown at block 704. Deeplinks are identified for one of the web pages, as shown at block 706. Action-based deeplinks are also identified for the web page, as shown at block 708. In particular, data may be stored for the web page, identifying deeplinks and action-based deeplinks for the web page. Accordingly, a search result is generated for the web page, as shown at block 710. The search result may include a hyperlink to the web page, the deeplinks, and the action-based deeplinks. The search result is provided to the end user device for presentation to the end user, as shown at block 712.

When the search result is presented, the search result may include a hyperlink to a destination web page corresponding with the search result. Additionally, the search result may include the deeplinks and the action-based deeplinks, which link to different web pages. In embodiments, the search result may include any number of deeplinks and action-based deeplinks. In some embodiments, the action-based deeplinks may be presented more prominently than the traditional deeplinks. The end user may select an action-based deeplink from the search result, as shown at block 714. In response to the user selection, the end user is navigated to the destination web page corresponding with the selected action-based deeplink, as shown at block 716.

Surfacing Actions from Social Data

End users often report actions they perform in their social networking messages. As such, social data from social networking services may be analyzed to identify actions that end users are performing and that information may be used in determining what deeplinks to provide for search results returned by a search engine service in response to user search queries.

For instance, an end user may post a status message such as: "I just watched Star Wars: Episode I at Regal Cinemas." Here, the action performed would be a "watch" action or a "buy movie tickets" action. When this action is seen in multiple social networking messages from various end users, it's likely that this is a popular action that should be surfaced as a deeplink when returning search results.

Accordingly, some instances of the present invention are directed to accessing social data and analyzing the social data to identify actions. Using the social data may improve the precision and recall of the action dataset for deeplinks.

The social data may generally include a number of discrete social networking messages from social networking services. As used herein, a "social networking service" may be any type of online service that facilitates sharing messages and other content among end users within a social network. As used herein, a "social network" may be a group of end users who are linked together for content sharing purposes. In some instances, the linking between two end users may require a first end user to request to be linked to the second end user and the second end user to accept that linking (e.g., "friending" via "friend request" and "acceptance"). In other instances, the linking may simply include an end user subscribing to be linked to another user or group of users. Examples of social networking services include the FACEBOOK, TWITTER, LINKEDIN, MYSPACE, and GOOGLE PLUS social networking services. As used herein, a "social networking message" may be any type of message or other content shared among end users within a social network via a social networking service. For example, a social networking message may be a post, a status update, or a "tweet." A social networking message may be shared among all end users within a particular social network or only a subset of the end users within the social network.

The social data may be analyzed to identify common actions discussed in social networking messages. Additionally, the social data may be analyzed to identify URLs of web pages at which those actions may be performed. That information may then be used to store metadata that may be used to select deeplinks for search results.

In some instances, the social networking messages may be analyzed to identify not only actions but entities and/or segments associated with the actions and that information may be used in determining what information to extract and store for deeplink purposes. An entity may be the object associated with the action in a social networking message. For instance, in the above example post: "I just watched Star Wars: Episode I at Regal Cinemas," the entity that may be identified with the "watch" action may be "Stars Wars: Episode I" and/or "Regal Cinemas." A segment is a broader category to which a related entity belongs and/or a website category (e.g., as discussed hereinabove) to which websites at which the action may be performed belong. For instance, in the above example post, the identified entity may be classified to a segment for "movies." Alternatively, a URL for the "Regal Cinemas" website may be identified and that URL may be determined to belong to a website category corresponding with a segment for "movies."

By identifying entities and/or segments associated with actions, the various actions for a given entity and/or segment may be identified and the most popular or "top" actions for an entity and/or segment may be determined based on various factors, such as the number of social networking messages discussing the action or how recent the messages were posted.

Figure 8:
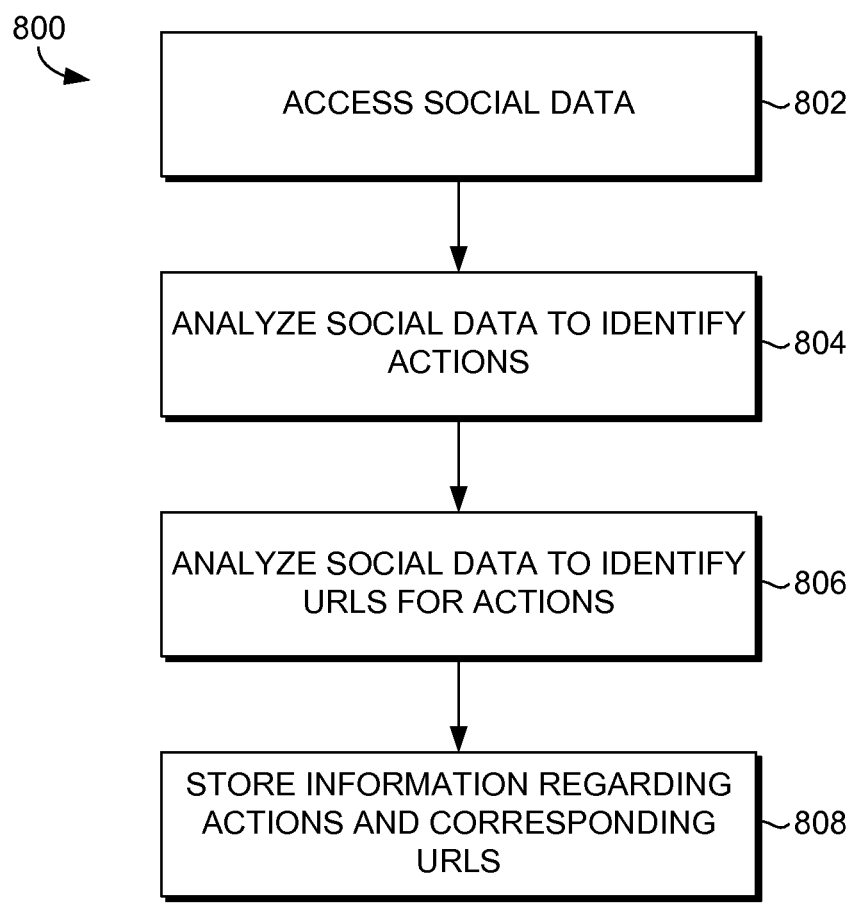
FIG. 8 is a flow diagram showing a method for analyzing social data to identify actions and corresponding URLs at which those actions may be performed in accordance with an embodiment of the present invention.

Turning now to FIG. 8, a flow diagram is provided that illustrates a method 800 for analyzing social data to identify actions and corresponding URLs at which those actions may be performed. As shown at block 802, social data is accessed. As indicated previously, social data may include any number of discrete social networking messages. The social data may be obtained in any number of different ways. For instance, social data may be accessed by crawling social networking sites or other locations to retrieve the data. Additionally, social data may be accessed via feeds or employing APIs provided by social networking services.

The social data is analyzed to identify actions discussed by end users within the social networking messages, as shown at block 804. For instance, in the example post: "I just watched Star Wars: Episode I at Regal Cinemas," the action may be "watched." An action may be identified in a social networking message in a number of different ways. For instance, an action may be identified by parsing the message and performing lexical analysis to identify an action word or phrase in the text of the message. In some instances, a social networking message may have an associated schema defined by the social networking service or otherwise and the action may be identified based on the schema associated with the message.

The social data is also analyzed to identify URLs of web pages at which the actions may be performed, as shown at block 806. For instance, continuing the example post above, the URL of a web page at which an end user may purchase tickets to watch a movie at Regal Cinemas may be identified.

In some instances, URLs may be embedded with the social data. For example, end users may include URLs when they compose messages. In other instances, URLs may be automatically included when social networking messages are generated. Accordingly, when a social networking message includes an embedded URL, that URL may be identified as corresponding with the action identified from that social networking message.

In other instances, URLs may be identified from additional analysis. For instance, when a social networking message is analyzed, both an action and an entity may be identified. An entity may be identified, for instance, by performing lexical analysis of a social networking message or relying on a schema for the social networking message to identify the object of the message. The object may be identified as a particular entity. A website for that entity may then be identified. The website may be identified for an entity, for instance, by relying on an existing knowledge base, such as the ODP, that may link entities to websites or particular web pages. The website may then be analyzed to identify a web page (and corresponding URL) at which the action (identified from the social networking message may be performed). The web page for an action may be identified, for instance, by analyzing the content of the web page or analyzing anchor text of a link to the web page. By way of example to illustrate, continuing the post above, the entity "Regal Cinemas" may be identified from the post, a website for "Regal Cinemas" may be identified, and the website may be analyzed to identify a web page at which movie tickets may be purchased.

In some instances, URLs identified from social data may need to be normalized for use in deeplinks. In particular, the URLs identified from social data for a particular action may not point to a web page that allows performance of the particular action generically but may include additional parameters. For instance, in the example in which the action corresponds with buying movie tickets at a particular theater, the associated social networking messages that include the action may include URLs that correspond with specific movies. To illustrate, a number of end users may have posted messages that include URLs that correspond with the various movies the end users watched at a particular theater. By way of example to illustrate, the URLs may include: www.exampletheatresite.com/buytickets?movie=firstmovie and www.exampletheatresite.com/buytickets?movie=secondmovie.

As can be seen, these two URLs correspond with different movies (i.e., "firstmovie" and "secondmovie"). To identify a URL at which tickets may be purchased for any movie (i.e., a generic URL for the action), the URLs may be analyzed to identify a pattern. That pattern may then be analyzed to determine additional parameters that may be removed to identify the generic URL. Those additional parameters may then be removed to provide the generic URL for the action. For instance, from the above example URLs, the generic URL for a "buy movie ticket" action may be: www.exampletheatresite.com/buytickets.

Information regarding identified actions and corresponding URLs is stored, as shown at block 808. The information stored for URLs may be generic URLs determined as discussed above. As such, this information may be used during runtime, when a search query is issued to a search engine, to provide deeplinks as part of search results returned in response to the search query.

In some instances, information obtained from social data (e.g., actions and/or URLs) may be validated using the traditional deeplinks pipeline of the search engine service. The traditional deeplinks pipeline may identify deeplinks by identifying top URLs that users visit within websites. Accordingly, actions and/or URLs identified from social data may be validated and/or otherwise used in conjunction with the traditional deeplinks pipeline for determining which deeplinks to provide for search results.

Social data may be processed to identify actions and URLs corresponding with the actions in a variety of different manners in accordance with various embodiments of the present invention. In some instances, the process may include clustering, classifying, or other techniques to improve precision, for instance, by identifying the top actions and more reliably identifying associated URLs for actions. In one approach, actions may be identified from social networking messages (e.g., using lexical analysis or another technique as indicated above), and social networking messages may be grouped into clusters (e.g., using a naïve clustering algorithm or other technique) based on the actions identified for the messages. URLs may then be identified from the social networking messages within each cluster. In some instances, top actions may also be identified, and information for only those top actions may be stored (e.g., at block 808 of FIG. 8). The top actions may be identified based on any number of factors, such as the number of social networking messages within a clusters, how recent each social networking message within a cluster was posted, and the number of different end users posting messages in a cluster, to name a few.

Figure 9:
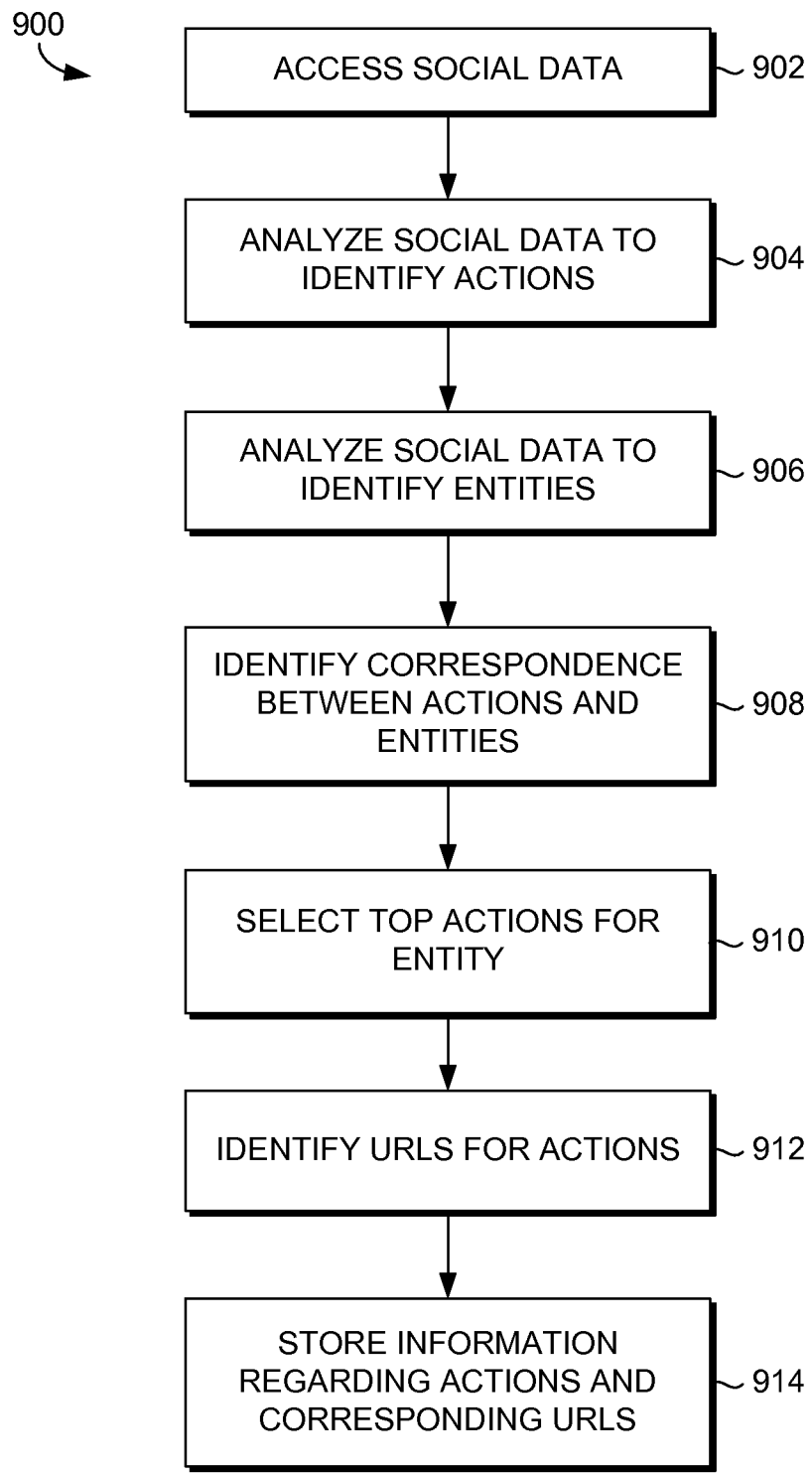
FIG. 9 is a flow diagram showing a method for identifying actions and associated entities in accordance with an embodiment of the present invention.

In some instances, social data may be analyzed to identify actions associated with entities and that information may be employed to determine what information to store for deeplink purposes. In particular, social networking messages may include identification of both an action and an associated entity. Referring to FIG. 9, a flow diagram is provided that illustrates a method 900 for identifying actions and associated entities. As shown at block 902, social data is accessed, for instance, similar to the approach discussed above for block 802 of FIG. 8. The social data is analyzed to identify actions, as shown at block 904. Additionally, the social data is analyzed to identify entities, as shown at block 906. Entities may be identified in a number of different ways within the scope of embodiments of the present invention. By way of example, an entity may be identified in a social networking message by lexical analysis to identify the object of the social networking message. That object may then be recognized as a particular entity.

Correspondence between actions and entities are also determined, as shown at block 908. This may include, for instance, identifying action, entity pairs, in which each action, entity pair represents an action and a corresponding entity associated with the action.

Action, entity pairs may be identified from the social data in a number of different ways. By way of example, social networking messages may first be clustered around either actions or entities and each of those clusters may then be subclustered based on the other. For instance, social networking messages may be first clustered around actions and each of those action clusters may then be subclustered around entities. Each subcluster would represent an action, entity pair. Another approach for identifying action, entity pairs may be to perform a first clustering of the social networking messages around actions and another clustering of the social networking messages around entities. The overlap of social networking messages between action clusters and entity clusters may be used to identify the action, entity pairs.

In this manner, the various actions available for a given entity may be identified, and that information may be used for determining what information to store. For instance, top actions for a particular entity may be identified, as shown at block 910. Top actions may be selected based on various factors, such as the number of social networking messages, how recent the messages were posted, and the number of end users. URLs for those top actions may be identified at block 912, and information for those top actions and corresponding URLs may be stored, as shown at block 914.

In some instances, social data may be analyzed to identify actions associated with entities and that information may be employed to determine what information to store for deeplink purposes. In particular, social networking messages may include identification of both an action and an associated entity.

Figure 10:
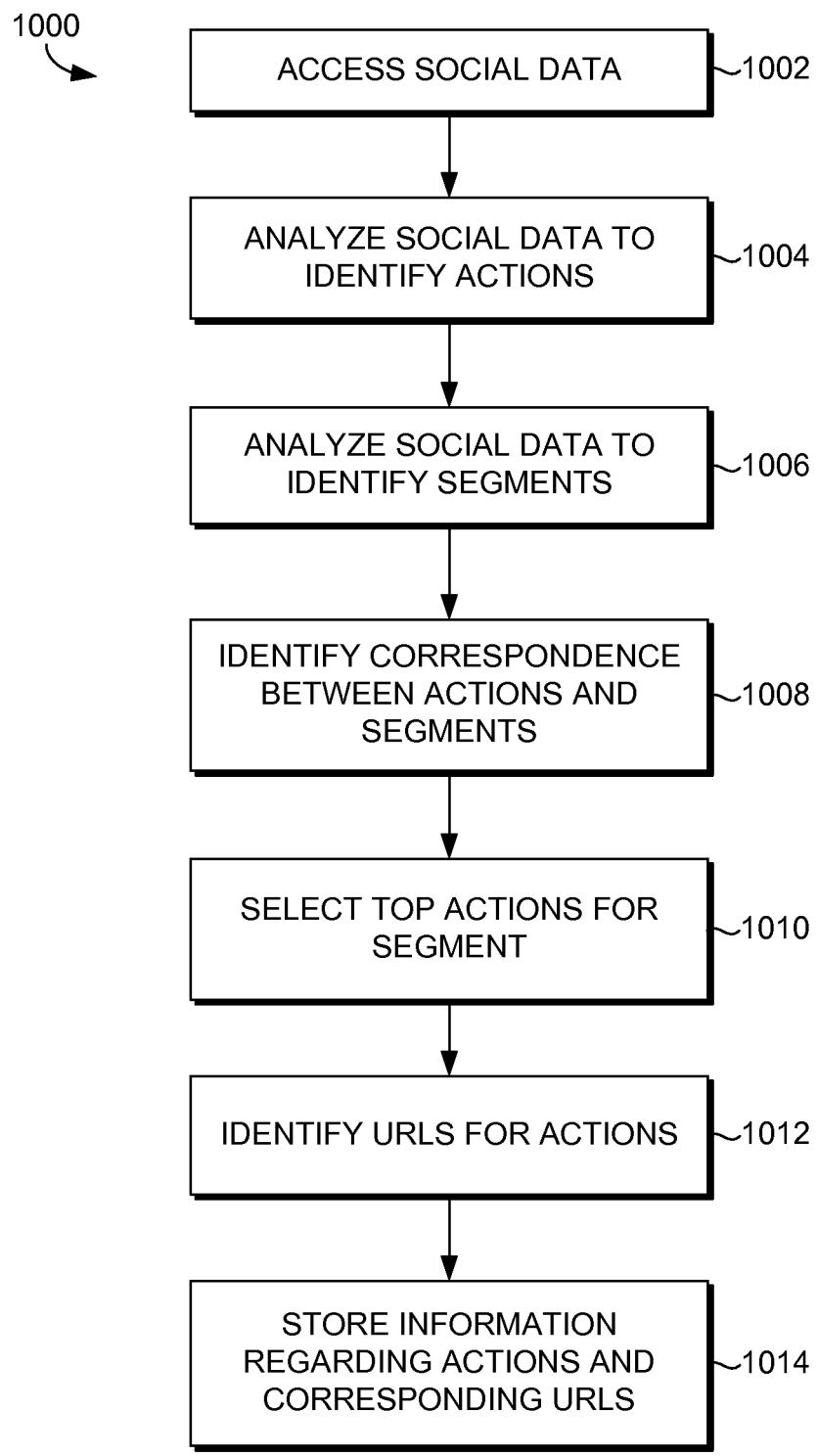
FIG. 10 is a flow diagram showing a method for identifying actions and associated segments in accordance with an embodiment of the present invention.

In further instances, social data may be analyzed to identify actions associated with segments and that information may be employed to determine what information to store for deeplink purposes. As previously indicated, a segment refers to a category of entities and/or websites. Referring to FIG. 10, a flow diagram is provided that illustrates a method 1000 for identifying actions and associated segments. As shown at block 1002, social data is accessed. The social data is analyzed to identify actions, as shown at block 1004. Additionally, the social data is analyzed to identify segments, as shown at block 1006. Segments may be identified, or instance, based on identified entities and/or identified URLs. When identifying segments from entities, an entity may first be identified (e.g., as discussed above) and that entity may be classified to a particular segment. Entities may be classified to particular segments using a variety of data sources. For instance, an existing knowledge base, such as the ODP or WIKIPEDIA, may be used to identify segments to which entities belong. Manual approaches for classifying entities to segments may also be employed.

URLs may be classified to particular segments using web page categorization techniques similar to the web page categorization techniques described hereinabove. As previously discussed, web page categorization may be performed in any of a number of different manners within the scope of embodiments of the present invention. In some embodiments, the categorization may be based on an existing repository of web page categorizations, such as the Open Directory Project (ODP). In some embodiments, web pages may be automatically grouped together into categories by analyzing the content of the pages. For instance, clustering techniques may be employed to cluster the web pages based on their content. As another example, the web pages may be categorized by looking for particular keywords in the content of the web pages. Web page categorization could also be automatically performed by analyzing the hyperlinks within the content of the web pages. Web page categorization may also include a manual approach based on editorial review of web pages to manually place the web pages into the different categories. In still further embodiments, a sample of manually-categorized web pages may be used as seeds for an automatic approach in which other web pages are compared against the seed web pages to categorize the other web pages. Any and all such variations and combinations thereof are contemplated to be within the scope of embodiments of the present invention.

Correspondence between actions and segments are also determined, as shown at block 1008. This may include, for instance, identifying action, segment pairs, in which each action, segment pair represents an action and a corresponding segment associated with the action.

Action, segment pairs may be identified in a number of different ways. By way of example, social networking messages may first be clustered around either actions or segments and each of those clusters may then be subclustered based on the other. For instance, social networking messages may be first clustered around actions and each of those action clusters may then be subclustered around segments. Each subcluster would represent an action, segment pair. Another approach for identifying action, segment pairs may be to perform a first clustering of the social networking messages around actions and another clustering of the social networking messages around segments. The overlap of social networking messages between action clusters and segment clusters may be used to identify the action, segment pairs.

In this manner, the various actions available for a given segment may be identified, and that information may be used for determining what information to store. For instance, top actions for a given segment may be identified, as shown at block 1010. URLs for those top actions may be identified at block 1012, and information for those top actions and corresponding URLs may be stored, as shown at block 1014.

Figure 11:
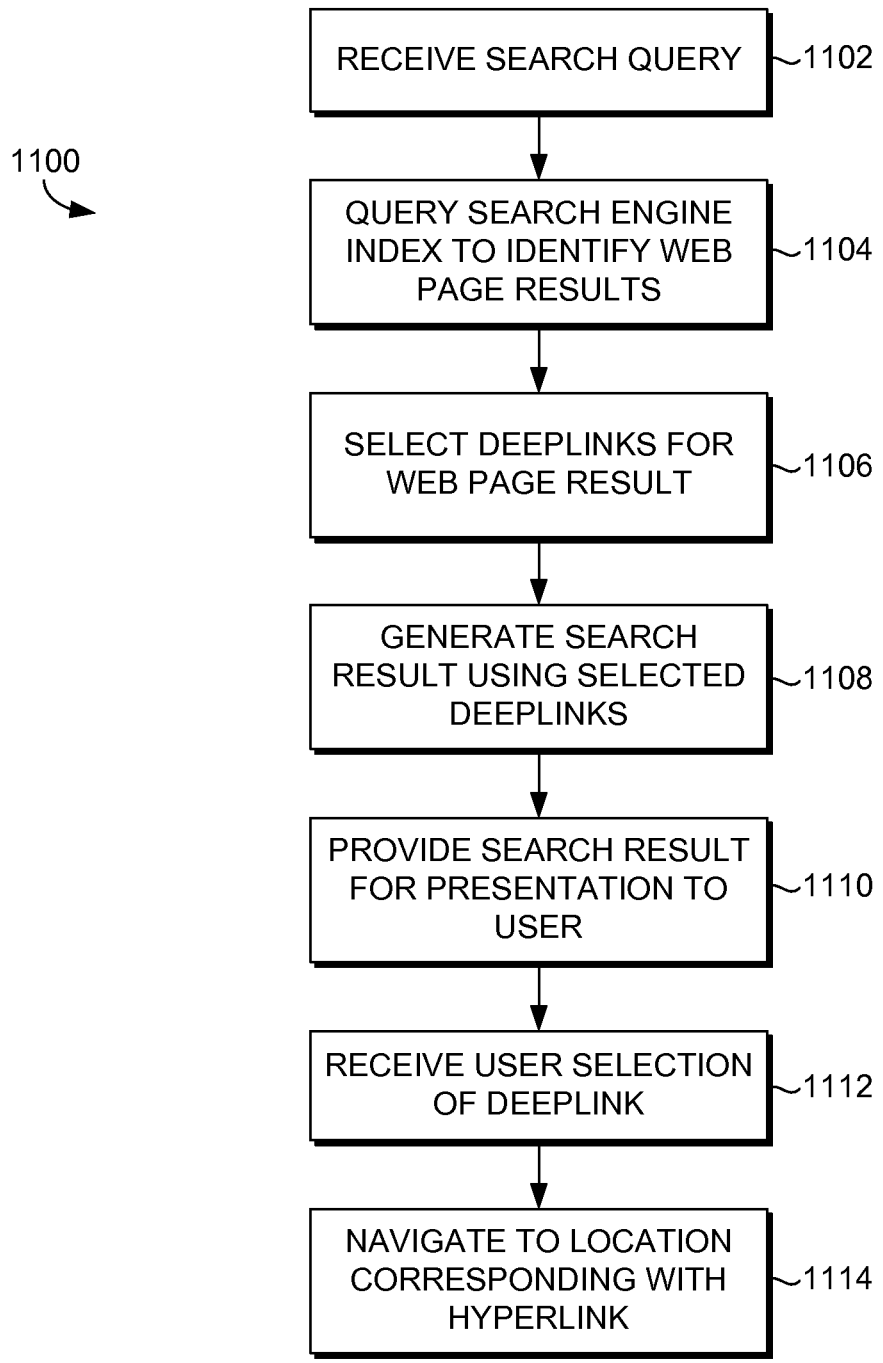
FIG. 11 is a flow diagram showing a method for providing a search result with deeplinks identified at least in part on social data in accordance with an embodiment of the present invention.

Turning now to FIG. 11, a flow diagram is provided that illustrates a method 1100 for providing a search result with deeplinks identified at least in part on social data. As shown at block 1102, a search query is received from an end user. In response to the search query, a search engine index is searched to identify relevant web pages, as shown at block 1104.

Deeplinks are selected for one of the web page results, as shown at block 1106. The deeplinks may be selected, for instance, based on metadata stored in a search engine index for the web page. At least one of the deeplinks selected for the web page result is based on information gathered from social data. In particular, the deeplink may correspond with an action and URL that were identified by analyzing social data, for instance, using one of the above-discussed methods.

A search result is generated to include the deeplinks, as shown at block 1108. The search result is provided for presentation to the end user, as shown at block 1110. The deeplinks included with the search result may include at least one deeplink identified based on analysis of social data and at least one deeplink identified independent of social data (e.g., a default deeplink for the web page). In some instances, a deeplink identified from social data may be shown with other deeplinks. If provided with other deeplinks, the social data-based deeplink may be shown the same as the other deeplinks. Alternatively, the social data-based deeplink may be shown differently than the other deeplinks, for instance, by highlighting the social data-based deeplink, providing some text treatment (e.g., bolding, highlighting, etc.). In other instances, a deeplink identified from social data may be shown separate from other deeplinks (e.g., at a different location within the search result). In some instances, a social-data based deeplink may be displayed as an action-based deeplink, such as those described above. For instance, a social data-based deeplink may be displayed as an action-based deeplink separate from other deeplinks in a search result. Additionally, the social data-based deeplink may correspond with an action common to websites within a particular category and be displayed similarly to the way other action-based deeplinks of that type of action are displayed for search results for other websites within that website category to provide users with a more consistent search experience.

The end user may select a deeplink from the search result, as shown at block 1112. In response to the user selection, the end user is navigated to the destination web page corresponding with the selected deeplink, as shown at block 1114.

A number of search results may be returned in response to search queries. In some instances, only the top search result may be processed to provide deeplinks using embodiments of the present invention. In other instances, deeplinks may be provided with any search result. Any and all combinations and variations thereof are contemplated to be within the scope of embodiments of the present invention.

Figure 12:
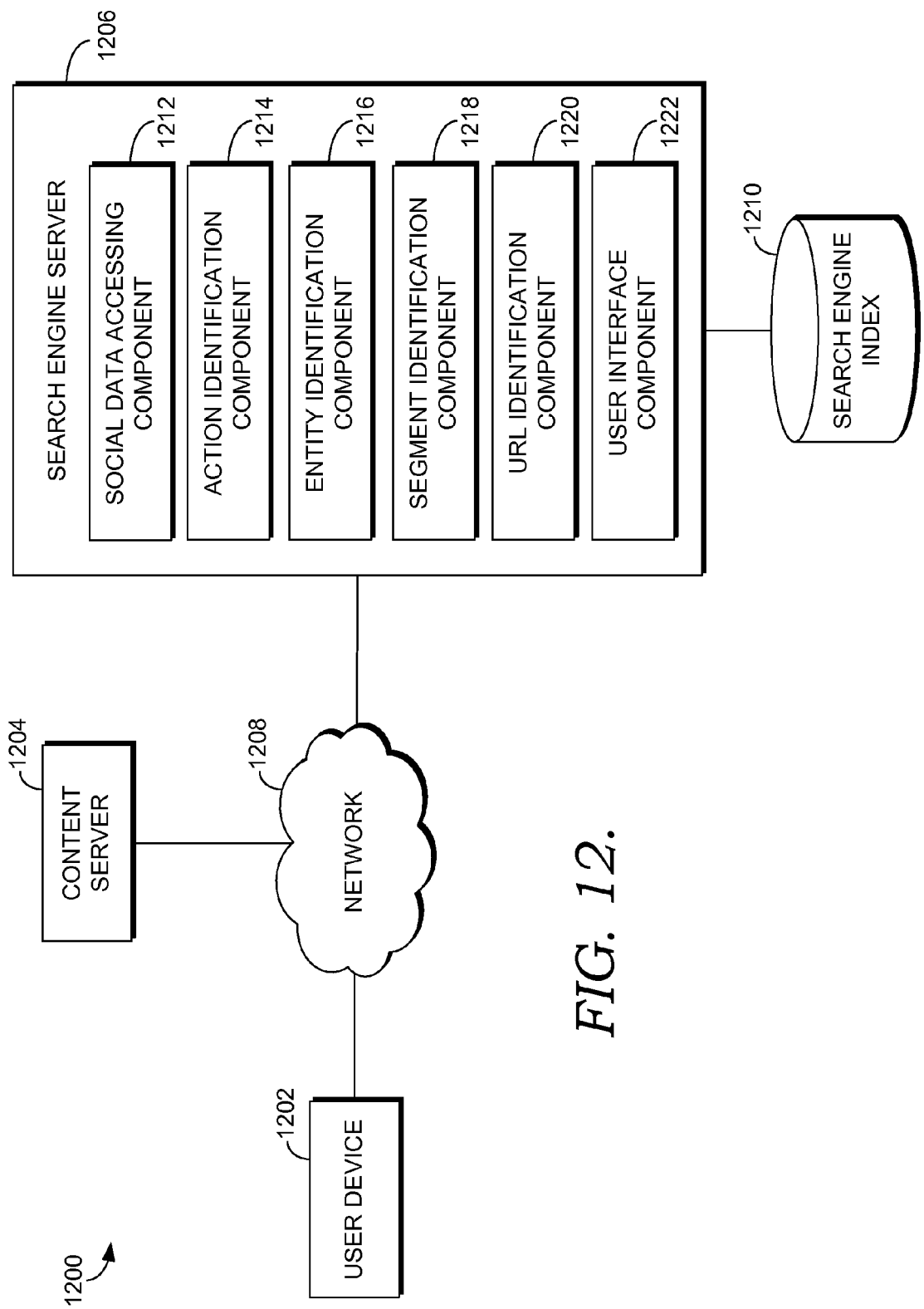
FIG. 12 is a block diagram of an exemplary system in which embodiments of the invention may be employed.

Referring next to FIG. 12, a block diagram is provided illustrating an exemplary system 1200 in which some embodiments of the present invention may be employed. It should be understood that this arrangement is set forth only as an example. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 1200 may include a user device 1202, content server 1204, and search engine server 1206. Each of the components shown in FIG. 12 may be any type of computing device, such as computing device 100 described with reference to FIG. 1, for example. The components may communicate with each other via a network 1208, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 1200 within the scope of the present invention. Each may comprise a single device or multiple devices cooperating in a distributed environment. For instance, the search engine server 1206 may comprise multiple devices arranged in a distributed environment that collectively provide the functionality of the search engine server 1206 described herein. Additionally, other components not shown may also be included within the system 1200.

The search engine server 1206 generally operates to index information regarding web pages served by content servers, such as the content server 1204, in a search engine index 1210. When the search engine server 1206 receives search queries from user devices, such as the user device 1202, the search engine queries the search engine index 1210 to identify search results based on the users' search queries and returns those search results to the user devices. In accordance with some embodiments of the present invention, the search engine server 1206 is also configured to identify actions based on social data and to provide deeplinks with search results based at least in part actions identified from the social data.

In the embodiment shown in FIG. 12, the search engine server 1206 includes, among other things, a social data accessing component 1212, an action identification component 1214, an entity identification component 1216, a segment identification component 1218, a URL identification component 1220, and a user interface component 1222. Although not shown in FIG. 12, the search engine server 1206 may include components from the search engine server 206 described above with reference to FIG. 2, for instance, to categorize websites and identify actions common to websites within given categories.

The social data accessing component 1212 operates to access social data from various social networking services. The action identification component 1214 operates to identify actions in the social data. The entity identification component 1216 operates to identify entities associated with actions in the social data. The segment identification component 1218 operates to identify segments associated with actions in the social data. The URL identification component 1220 operates to identify URLs associated with actions in the social data. These components may operate to identify actions, entities, segments, and/or URLs, for instance, using approaches such as those described above with reference to FIGS. 8, 9, and 10.

The user interface component 1222 provides an interface to user devices, such as the user device 1202, that may allow users to submit search queries to the search engine server 1206 and to receive search results from the search engine server 1206. It should be understood that the user device 202 may be any type of computing device employed by a user to submit search queries and receive search results. By way of example only and not limitation, the user device 1202 may be a desktop computer, a laptop computer, a tablet computer, a mobile device, or other type of computing device. The user device 1202 may include an application that allows a user to enter a search query and submit the search query to the search engine server 206 to retrieve search results. For instance, the user device 1202 may include a web browser that includes a search input box or allows a user to access a search page to submit a search query. Other mechanisms for submitting search queries to search engines are contemplated to be within the scope of embodiments of the present invention.

When the search engine server 1206 receives a search query, the search engine index 1210 is queried to identify search results. In some instances, a search result may have a corresponding parameterized action that has been identified by the parameterized action identification component 1212 with corresponding parameters identified by the parameter identification component 1214. Accordingly, when the search engine server 1206 returns the search result to the user device 1202, the search result includes not only a hyperlink to the destination web page of the search result, but also deeplinks to pages available at the website corresponding with the web page. The deeplinks may include at least one deeplink that was identified based at least in part of analysis of social data.

As can be understood, embodiments of the present invention include identifying actions from social data and using that information for deeplink purposes. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform a method, the method comprising:
   accessing social data from one or more social networking services;
   analyzing text of the social data to identify a plurality of online actions based on actions discussed by users in the text of the social data by identifying an online action in each social networking message of the social data, and grouping social networking messages into clusters based on online actions;
   analyzing the social data to identify at least one URL for each online action, each URL corresponding with a webpage at which a corresponding online action may be performed, wherein analyzing the social data to identify a URL for at least one online action comprises: identifying an entity within a social networking message in which the at least one online action was identified, identifying a website based on the entity, and analyzing web pages in the website to identify a webpage that provides for the at least one online action; and
   storing information regarding at least a portion of the plurality of online actions and corresponding URLs for providing deeplinks for search results.

2. The one or more computer storage media of claim 1, wherein the social data comprises at least one selected from the following: a status message, and a post.

3. The one or more computer storage media of claim 1, wherein analyzing the social data to identify a URL for at least one online action comprises identifying an embedded URL in a social networking message in which the at least one online action was identified.

4. The one or more computer storage media of claim 1, wherein the method further comprises:
   analyzing the social data to identify an entity;
   analyzing at least a portion of the plurality of online actions to identify top online actions for the entity; and
   wherein storing information comprises storing information for top online actions for the entity.

5. The one or more computer storage media of claim 1, wherein the method further comprises:
   analyzing the social data to identify a segment;
   analyzing at least a portion of the plurality of online actions to identify top online actions for the segment; and
   wherein storing information comprises storing information for the top online actions for the segment.

6. The one or more computer storage media of claim 5, wherein analyzing the social data to identify the segment comprises:
   analyzing the social data to identify a plurality of entities; and
   classifying the entities to a plurality of segments.

7. The one or more computer storage media of claim 5, wherein analyzing the social data to identify the segment comprises:
   analyzing the social data to identify a plurality of URLs; and
   classifying the URLs to a plurality of segments.

8. The one or more computer storage media of claim 1, wherein analyzing the social data to identify at least one URL for each online action comprises identifying a first URL for a first online action by:
   identifying a group of URLs corresponding with the first online action;
   determining a URL pattern from the group of URLs; and identifying the first URL by generating a generic URL based on the URL pattern.

9. The one or more computer storage media of claim 1, wherein the method further comprises validating at least one online action and a corresponding URL using a traditional deeplinks pipeline.

10. The one or more computer storage media of claim 1, wherein the method further comprises:
- receiving a search query from an end user at a search engine service;
- identifying a web page in response to the search query by querying a search engine index based on the search query;
- identifying deeplinks for the web page, at least one deeplink having been identified from at least a portion of the stored information from analysis of the social data;
- generating a search result for the web page to include the deeplinks; and
- providing the search result for presentation to the end user.

11. One or more computer storage media storing computer-useable instructions that, when used by one or more computing devices, cause the one or more computing devices to perform a method, the method comprising:
- accessing social data from one or more social networking services;
- analyzing text of the social data to identify a plurality of online actions based on actions discussed by users in the text of the social data;
- analyzing the social data to identify a plurality of segments;
- identifying a group of online actions for a first segment based on the plurality of online actions and the plurality of segments from the social data by identifying action, segment pairs based on the plurality of online actions and plurality of segments from the social data, and identifying action, segment pairs corresponding with the first segment;
- wherein analyzing the social data to identify the plurality of online actions and plurality of segments and identifying the action, segment pairs comprises: grouping social networking messages from the social data into action clusters, grouping social networking messages from the social data into segment clusters, and identifying the action, segment pairs based on overlap of social networking messages between the action clusters and the segment clusters;
- selecting top online actions from the group of online actions for the first segment;
- identifying a URL for each top online action; and
- storing information regarding the top online actions and corresponding URLs for providing deeplinks for search results.

12. The one or more computer storage media of claim 11, wherein analyzing the social data to identify the plurality of segments comprises:

analyzing the social data to identify a plurality of entities; and classifying the entities to the plurality of segments.

13. The one or more computer storage media of claim 11, wherein analyzing the social data to identify the plurality of segments comprises:
- analyzing the social data to identify a plurality of URLs; and
- classifying the URLs to the plurality of segments.

14. The one or more computer storage media of claim 11, wherein the method further comprises:
- receiving a search query from an end user at a search engine service;
- identifying a web page in response to the search query by querying a search engine index based on the search query;
- identifying deeplinks for the web page, at least one deeplink having been identified from at least a portion of the stored information from analysis of the social data;
- generating a search result for the web page to include the deeplinks; and
- providing the search result for presentation to the end user.

15. A method comprising:
- receiving a search query from an end user at a search engine service;
- identifying a web page in response to the search query by querying a search engine index based on the search query;
- identifying deeplinks for the web page, at least one deeplink having been identified based at least in part on an analysis of text of social data to identify an online action based on an action discussed by at least one user in the text of the social data and a URL for the online action, the URL corresponding with the at least one deeplink,
- wherein the online action was identified by identifying an online action in each social networking message of the social data, and grouping social networking messages into clusters based on online actions, and
- wherein the URL for the online action was identified by identifying an entity within a social networking message in which the online action was identified, identifying a website based on the entity, and analyzing web pages in the website to identify a webpage that provides for the online action;
- generating a search result for the web page to include the deeplinks; and
- providing the search result for presentation to the end user.

16. The method of claim 15, wherein the at least one deeplink is identified by identifying a website corresponding with the web page and identifying the at least one deeplink as being associated with the website.

* * * * *